United States Patent [19]

Nishikawa et al.

[11] Patent Number: 5,436,295
[45] Date of Patent: Jul. 25, 1995

[54] THERMOPLASTIC ELASTOMER COMPOSITION

[75] Inventors: Makoto Nishikawa, Hasaki; Katsuya Hashimoto; Masao Ishii, both of Kashima, all of Japan

[73] Assignee: Kuraray Company, Ltd., Kurashiki, Japan

[21] Appl. No.: 178,653

[22] Filed: Jan. 7, 1994

[30] Foreign Application Priority Data

Jan. 20, 1993 [JP] Japan .................................. 5-024838

[51] Int. Cl.$^6$ ............................................. C08L 75/04
[52] U.S. Cl. ................................. 525/92 C; 525/127; 525/130; 525/125
[58] Field of Search .................. 525/125, 127, 130, 98, 525/92

[56] References Cited

U.S. PATENT DOCUMENTS 4,980,417 12/1990 Biglione et al. ..................... 525/125

FOREIGN PATENT DOCUMENTS 2250804 6/1975 France .
1913683 10/1969 Germany .
52-150464 12/1977 Japan .
56-115352 9/1981 Japan .
1581167 12/1980 United Kingdom .

*Primary Examiner*—James J. Seidleck
*Assistant Examiner*—Mary Critharis
*Attorney, Agent, or Firm*—Oblon, Spivak, McClelland, Maier & Neustadt

[57] ABSTRACT

A thermoplastic elastomer composition comprises the following two components:

(a) a thermoplastic polyurethane having soft segments from a poly (3-methyl-1,5-pentane adipate) diol having a molecular weight of at least 2,000 and having a JIS A hardness at 25° C. of not more than 80, and (b) a block copolymer comprising at least 2 polymer blocks A principally comprising an aromatic vinyl compound and at least 1 block B comprising an olefinic elastomer, said aromatic vinyl compound being contained in an amount of 5 to 50% by weight based on the weight of the block copolymer and the olefinic elastomer block having a glass transition point of not higher than $-20°$ C. and a heat of fusion of crystal of not more than 8 cal/g;

the ratio by weight between the component (a) and the component (b) being (a)/(b)=95/5 to 5/95.

12 Claims, No Drawings

THERMOPLASTIC ELASTOMER COMPOSITION

BACKGROUND OF THE INVENTION

1. Field of the Invention

The present invention relates to a thermoplastic elastomer composition comprising a specific polyurethane and a specific aromatic vinyl compound-olefinic compound block copolymer and having excellent flexibility and resistance to abrasion, heat and oil.

2. Description of the Related Art

Thermoplastic polyurethanes, having excellent abrasion resistance and oil resistance, are used for hoses, belts, tubes and the like, but they have the drawbacks of poor hot water resistance and weather resistance and are hence their uses are limited. On the other hand, aromatic vinyl compound-olefinic compound block copolymers are excellent in rubber elasticity and hot water resistance, but their uses are also limited due to poor resistance to oil and abrasion and other drawbacks.

To eliminate the drawbacks of both thermoplastic polyurethanes and aromatic vinyl compound-olefinic compound block copolymers, blending of the two component has been attempted. However, sufficient properties have not been created by the blending, since thermoplastic polyurethanes and aromatic vinyl compound-olefinic compound block copolymers generally have poor compatibility with each other. For example BP 1581167 and Japanese Patent Application Laid-open No. 150464/1977 describe that molded articles having excellent tensile strength are obtainable from compositions comprising a polyether-based thermoplastic polyurethane and a block copolymer comprising a conjugated diene compound having a structure of X-Y-X (X: polymer block-comprising an aromatic vinyl compound; Y: polymer block comprising a conjugated diene compound) with at least 70% of the conjugated diene compound part being hydrogenated. The above compositions, however, have poor transparency due to poor compatibility of the two components.

It has also been attempted, in order to improve the compatibility of thermoplastic polyurethanes with aromatic vinyl compound-olefinic compound block copolymers, to add a dicarboxylic acid-modified block copolymer as a compatibility improving agent (see Japanese Patent Application Laid-open No. 115352/1981). However, this attempt can hardly be said to have achieved sufficient improvement.

SUMMARY OF THE INVENTION

Accordingly, an object of the present invention is to improve compatibility of a thermoplastic polyurethane and an aromatic vinyl compound-olefinic compound block copolymer and provide a thermoplastic elastomer composition having good flexibility and oil resistance.

The present inventors have found that a specific thermoplastic polyurethane and a specific aromatic vinyl compound-olefinic compound block copolymer have good compatibility with each other and come to the invention.

The present invention provides a thermoplastic elastomer composition comprising the following two components:

(a) a thermoplastic polyurethane having soft segments from a poly(3-methyl-1,5-pentane adipate)diol having a molecular weight of at least 2,000 and having a JIS A hardness at 25° C. of not more than 80, and (b) a block copolymer comprising at least 2 polymer blocks A principally comprising an aromatic vinyl compound and at least 1 block B comprising an olefinic elastomer, said aromatic vinyl compound being contained in an amount of 5 to 50% by weight based on the weight of said block copolymer and said olefinic elastomer block having a glass transition point of not higher than −20° C. and a heat of fusion of crystal of not more than 8 cal/g;

the ratio by weight between said component (a) and said component (b) being (a)/(b)=95/5 to 5/95.

DETAILED DESCRIPTION OF THE INVENTION

The poly(3-methyl-1,5-pentane adipate)diol, which constitutes the soft segments of the thermoplastic polyurethane used as component (a) in the present invention, is a polyester diol obtained by polycondensation of adipic acid and 3-methyl-1,5-pentanediol. Use of polymer diols other than this type polyester diol yields thermoplastic polyesters having insufficient compatibility with component (b) of an aromatic vinyl compound-olefinic compound block copolymer. The polyester diol used in the present invention should have a molecular weight of at least 2,000. If the molecular weight is less than 2,000, the resulting compositions have poor mechanical properties.

Examples of short-chain glycols constituting the thermoplastic polyurethane used in the present invention are ethylene glycol, 1,4-butanediol and 1,4-hexanediol, among which 1,4-butanediol is particularly preferred. Examples of diisocyanates constituting the thermoplastic polyurethane are tolylene diisocyanate, isophorone diisocyanate, 4,4'-diphenylmethane diisocyanate (MDI), among which 4,4'-diphenylmethane diisocyanate is particularly preferred.

The polyester diol used in the present invention should also have a JIS A hardness at 25° C. of not more than 80. If a polyester diol having the hardness exceeding 80 is used, the resulting thermoplastic polyurethane will have poor compatibility with an aromatic vinyl compound-olefinic compound block copolymer that constitutes component (b).

The aromatic vinyl compound-olefinic compound block copolymer that constitutes another component used in the present invention is a block copolymer comprising at least 2 polymer blocks A principally comprising an aromatic vinyl compound and at least 1 block B comprising an olefinic elastomer, wherein the aromatic vinyl compound is contained in an amount of 5 to 50% by weight based on the weight of the block copolymer and the olefinic elastomer block has a glass transition point of not higher than −20° C. and a heat of fusion of crystal of not more than 8 cal/g.

Examples of usable aromatic vinyl compounds are styrene, α-methylstyrene, o-, m- and p-methyl styrenes, 1,3-dimethylstyrene, vinylnaphthalene and vinylanthracene. These compounds may be used singly or in combination. The aromatic compounds are contained in the above block copolymer in an amount of 5 to 50% by weight. If the content deviates from the above range, a block copolymer having sufficient rubber elasticity cannot be obtained.

The block B comprising an olefinic elastomer constitutes a soft segment in the block copolymer and has a glass transition point of not more than −20° C. and a heat of fusion of crystal of not more than 8 cal/g. With a glass transition point exceeding −20° C., the resulting composition has poor rubber elasticity. With a heat of fusion of crystal exceeding 8 cal/g, the resulting composition has poor flexibility at low temperatures.

Examples of the olefinic elastomer block are hydrogenation products of polymers of 1,3-butadiene, isoprene, 2,3-dimethyl-1,3-butadiene, 1,3-pentadiene, 1,3-hexadiene or mixtures of the foregoing, and polymers of isobutylene and α-olefins.

Preferred among the above are hydrogenation products of polymers of 1,3-butadiene, isoprene or mixtures thereof. Where the block is a hydrogenation product of polyisoprene, it has a structure of ethylene-propylene alternate copolymer. Where the block is a hydrogenation product of a copolymer of 1,3-butadiene and isoprene, it has a structure of ethylene-ethylene.propylene random copolymer.

Where the above block is a hydrogenation product of a conjugated diene polymer, it is desirable that at least 70% of the aliphatic double bonds based on the conjugated diene be saturated. If the degree of saturation of aliphatic double bonds are less than 70%, the obtained block copolymer will sometimes have insufficient resistance to heat aging. Also, where the above block is a hydrogenation product of a conjugated diene polymer, it is desirable that the amount of vinyl bonds be not more than 50%. If the amount of vinyl bonds exceeds 50%, the resulting block copolymer will sometimes have poor low temperature characteristics.

The block copolymer may have any molecular weight, but in general the copolymer has a molecular weight of 10,000 to 1,000,000, more preferably 20,000 to 300,000.

The block copolymer may have a molecular structure of linear, branched or any optional combination thereof. The block copolymer may incorporate, within limits that maintain its characteristics, polar groups such as hydroxyl group, carboxyl group, epoxy group and halogen groups, at its molecular ends or in its molecular chain, for the purpose of modification.

The block copolymer can be obtained in any process with no particular limitation and there may be available a process of hydrogenating a polymer obtained by anionic polymerization, ionic polymerization such as cationic polymerization, Ziegler polymerization, single-site polymerization or radical polymerization.

In the thermoplastic elastomer composition of the present invention, it is necessary that the thermoplastic polyurethane and the block copolymer be contained in a ratio by weight of [thermoplastic polyurethane]/[block copolymer] of 95/5 to 5/95. If the ratio by weight exceeds 95, the thermoplastic elastomer composition will have poor hot water resistance. On the other hand, if the ratio by weight is less than 5, the thermoplastic elastomer composition will have poor oil resistance. The ratio by weight between the thermoplastic polyurethane and the block copolymer is preferably in a range of 90/10 to 10/90, more preferably in a range of 70/30 to 30/70.

The thermoplastic elastomer composition of the present invention can incorporate, within limits not to impair it properties, modified products of the block copolymer and polystyrene, polyolefin, polyoxymethylene, polyphenylene ether and like resins, and, further, a plasticizer such as process oil, low molecular weight polyethylene or polyethylene glycol. Inorganic fillers can also be incorporated to reduce cost. Examples of usable inorganic fillers are talc, calcium carbonate, kaolin and titanium oxide.

Besides, the thermoplastic elastomer composition of the present invention may as required incorporate, for the purpose of improving its properties, glass fibers carbon fibers, antioxidant, light stabilizer, antistatic agent, releasing agent, fire retardant, foaming agent and like additives.

The thermoplastic elastomer composition of the present invention can be prepared with a kneader such as single-screw extruder, twin-screw extruder, conventional kneader or Banbary mixer.

The thermoplastic elastomer composition thus obtained can be molded by any optional process such as injection molding, blow molding or calendering.

The thermoplastic elastomer composition of the present invention, having the characteristics of excellent flexibility, abrasion resistance and oil resistance, is applicable to various end-uses including, hoses, belts, tubes for food, footwears such as shoes and sandals, food wrapping, wrapping for industrial materials, materials for lamination, elastic films for disposable diaper or the like, interior and exterior materials for automobile such as body panel and side seal, medical appliances such as blood bag, liquid transporting tube and gasket for syringe, leisure goods, sporting goods and toys.

Other features of the invention will become apparent in the course of the following descriptions of exemplary embodiments which are given for illustration of the invention and are not intended to be limiting thereof.

EXAMPLES

Examples 1 through 6 and Comparative Examples 1 through 4

(1) Preparation of polyester diol

A mixture of 928 g of adipic acid and 890 g of 3-methyl-1,5-pentanediol was heated in a stream of nitrogen and, while the temperature was being elevated from 160° to 200° C., the water that formed was distilled off form the reaction zone. After water had been almost distilled off, 15 ppm of tetraisopropyl titanate was added and then the system was evacuated. Under a reduced pressure of 2 to 10 mmHg, polycondensation was further effected, to obtain a polyester diol having a number average molecular weight of 3,500. After the system was allowed to cool to a temperature of 100° C., water was added in an amount of 2.0% based on the polyester diol and the mixture was stirred for 2 hours, to deactivate the titannate catalyst. After the deactivation of the catalyst, the water added was distilled off under a reduced pressure, to obtain a polyester diol having a hydroxyl group value of 32.0, an acid value of 0.10 and a number average molecular weight of 3,500. This was named PMPA3500.

(2) Preparation of thermoplastic polyurethanes

Continuous melt polymerization was conducted by continuously feeding to a twin-screw extruder the polyester diol obtained above, 4,4′-diphenylmethane diisocyanate (MDI) and 1,4-butanediol in such rates as to make the composition ratio of the resulting product 1:3:2, 1:4.1:3.1 or 1:6.4:5.4, and the obtained polyurethanes were extruded into water in the form of strands, which were then cut into pellets. The two types of the pellets thus obtained were vacuum-dried and aged at 80° C. for 12 hours to give pellets of thermoplastic polyurethanes. The polyurethanes thus obtained were heat pressed at 240° C. into sheets, which were then tested for JIS A hardness to give 65, 75 and 86, respectively. These polyurethanes were named PMPA3500-A65, PMPA3500-A75 and PMPA3500-A86, respectively.

(3) Preparation of block copolymers

A pressure-proof vessel equipped with a stirrer was charged with 3,000 g of cyclohexane, 50 g of sufficiently dewatered styrene and 0.01 mole of lithium sec-butyl and polymerization was effected at 60° C. for 60 minutes. Thereafter, 200 g of isoprene was added and polymerization was effected for 60 minutes, and then 50 g of styrene was added and polymerization was effected for 60 minutes, to obtain a styrene-isoprene-styrene block copolymer. The block copolymer thus obtained had a styrene content of 33% and a number average molecular weight of 35,000. To the polymer solution, a palladium catalyst was added in an amount of 1% by weight/polymer and hydrogenation was conducted under an atmosphere of 50 kg/cm$^2$ of hydrogen, to obtain a block copolymer with hydrogenation ratio of 90%. This was named SEPS-1.

In the same manner, there were conducted addition of 0.01 mole of lithium sec-butyl followed by polymerization at 60° C. for 60 minutes, addition of 200 g of a 50/50 by weight mixture of isoprene/butadiene followed by polymerization at 60° C. for 60 minutes and addition of 50 g of styrene followed by polymerization for 60 minutes, to obtain a styrene-isoprene/1,3-butadiene-styrene block copolymer. Hydrogenation was conducted in the same manner as above to obtain a block copolymer having a hydrogenation ratio of 98%. This was named SEEPS-1.

In the same manner, there were conducted addition of 0.01 mole of lithium sec-butyl followed by polymerization at 60° C. for 60 minutes, addition of 6 g of tetrahydrofuran and 200 g of 1,3-butadiene followed by polymerization for 60 minutes and addition of 50 g of styrene followed by polymerization for 60 minutes, to obtain a styrene-butadienestyrene block copolymer. Hydrogenation was conducted in the same manner as above to obtain a block copolymer having a hydrogenation ratio of 98%. This was named SEBS-1. The glass transition point and heat of fusion of crystal of each of these olefinic elastomers are shown in Table 1.

TABLE 1

|  | Glass transition point of olefin part (°C.) | Heat of fusion of olefin part (cal/g) |
| --- | --- | --- |
| SEPS-1 | −55 | 0 |
| SEEPS-1 | −58 | 2.1 |
| SEBS-1 | −50 | 4.5 |

(4) Preparation of thermoplastic elastomer compositions

Each of the block copolymers obtained above and each of the thermoplastic polyurethanes obtained above, i.e. PMPA3500-A65, PMPA3500-A75 and PMPA3500-A86, or a polyether-based thermoplastic polyurethane (KURAMIRON 9180, made by Kuraray Co., Ltd.) were fed to a Brabender in ratios as shown in Table 2 and melt blended in a stream of nitrogen at 200° C. for 5 minutes. The mixtures obtained were pressed to give test specimens for evaluation. The results of the evaluation are shown in Table 2. It is apparent from Table 2 that the thermoplastic elastomer compositions according to the present invention are, while having good rubber elasticity, excellent in oil resistance and hot water resistance.

Obviously, numerous modifications and variations of the present invention are possible in light of the above teachings. It is therefore to be understood that within the scope of the appended claims, the invention may be practiced otherwise than as specifically described herein.

TABLE 2

|  | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 |
| --- | --- | --- | --- | --- | --- | --- | --- | --- | --- | --- |
| PMPA3500-A65 | 80 | 50 | 20 |  | 50 | 50 | 100 |  |  |  |
| PMPA3500-A75 |  |  |  | 50 |  |  |  |  |  |  |
| PMPA3500-A86 |  |  |  |  |  |  |  |  | 50 |  |
| KURAMIRON 9180 |  |  |  |  |  |  |  |  |  | 50 |
| SEPS-1 | 20 | 50 | 80 | 50 |  |  |  | 100 | 50 | 50 |
| SEEPS-1 |  |  |  |  | 50 |  |  |  |  |  |
| SEBS-1 |  |  |  |  |  | 50 |  |  |  |  |
| Transparency | ○ | ○ | ○ | ○ | ○ | ○ | ○ | ○ | X | X |
| Hardness (JIS A) | 69 | 72 | 73 | 75 | 74 | 75 | 65 | 75 | — | — |
| Tensile strength (kg/cm$^2$) | 100 | 85 | 105 | 103 | 100 | 95 | 230 | 160 | — | — |
| Swelling degree | 1.6 | 12.6 | 34.0 | 10.5 | 10.5 | 11.1 | 0.1 | dissolved | — | — |
| Hot water resistance (%) | 70 | 103 | 92 | 98 | 100 | 98 | 15 | 105 | — | — |

① Transparency: Visually evaluated; ○ transparent, X: whitely opaque
② Hardness: Measured according to JIS K6301; JIS A
③ Tensile strength: Measured according to JIS K6301
④ Oil resistance: A sheet specimen of 1 × 1 × 0.1 cm was immersed in JIS #1 oil and the swelling degree after 4 days was measured and taken as an index of oil resistance.
⑤ Hot water resistance: A 0.1-cm dumbbell specimen immersed in hot water in a 500-cc Erlenmeyer flask equipped with reflux condenser at 100° C. for 2 days was tested for retention of tensile strength.

What is claimed is:

1. A thermoplastic elastomer composition comprising the following two components:
   (a) a thermoplastic polyurethane having soft segments from a poly(3-methyl-1,5-pentane adipate)-diol having a molecular weight of at least 2,000 and having a JIS A hardness at 25° C. of not more than 80, and
   (b) a block copolymer comprising at least 2 polymer blocks A principally comprising an aromatic vinyl compound and at least 1 block B comprising an olefinic elastomer, said aromatic vinyl compound being contained in an amount of 5 to 50% by weight based on the weight of said block copolymer and said olefinic elastomer block having a glass transition point of not higher than −20° C. and a heat of fusion of crystal of not more than 8 cal/g;

the ratio by weight between said component (a) and said component (b) being (a)/(b)=95/5 to 5/95.

2. The thermoplastic elastomer composition according to claim 1, wherein said block copolymer that constitutes component (b) has a molecular weight of 10,000 to 1,000,000.

3. The thermoplastic elastomer composition according to claim 1, wherein said block copolymer that constitutes component (b) has a molecular weight of 20,000 to 300,000.

4. The thermoplastic elastomer composition according to claim 1, wherein a glycol that forms a short chain component constituting said thermoplastic polyurethane that is component (a) is ethylene glycol, 1,4-butanediol or 1,4-hexanediol.

5. The thermoplastic elastomer composition according to claim 1, wherein an isocyanate that forms a short chain component constituting said thermoplastic polyurethane that is component (a) is tolylene diisocyanate, isophorone diisocyanate or 4,4'-diphenylmethane diisocyanate.

6. The thermoplastic elastomer composition according to claim 1, wherein said aromatic vinyl compound is selected from the group consisting of styrene, α-methylstyrene, o-, m- and p-methylstyrene, 1,3-dimethylstyrene, vinylnaphthalene and vinylanthracene.

7. The thermoplastic elastomer composition according to claim 1, wherein said olefinic elastomer block is a hydrogenation product of a polymer of 1,3-butadiene, isoprene, 2,3-dimethyl-1,3-butadiene, 1,3-pentadiene, 1,3-hexadiene or mixtures of the foregoing.

8. The thermoplastic elastomer composition according to claim 7, wherein said olefinic elastomer block is a hydrogenation product of a polymer of 1,3-butadiene, isoprene or mixtures of the foregoing.

9. The thermoplastic elastomer composition according to claim 1, wherein said olefinic elastomer block is a polymer of isobutylene or an α-olefin.

10. The thermoplastic elastomer composition according to claim 1, wherein said thermoplastic polyurethane and said block copolymer are contained in a ratio by weight of [thermoplastic polyurethane]/[block copolymer] of 90/10 to 10/90.

11. The thermoplastic elastomer composition according to claim 10, wherein said thermoplastic polyurethane and said block copolymer are contained in a ratio by weight of [thermoplastic polyurethane]/[block copolymer]]of 70/30 to 30/70.

12. The thermoplastic elastomer composition according to claim 7, wherein said polymer hydrogenation product is at least 70% saturated.

* * * * *